& VanSanten
United States Patent [19]

DuLaney et al.

[11] Patent Number: 5,057,179
[45] Date of Patent: Oct. 15, 1991

[54] RESURFACING COMPOSITIONS AND METHODS

[75] Inventors: Donald C. DuLaney; Robert H. Lindsay, both of Madison, Wis.

[73] Assignee: Lindsay Finishes, Inc., Madison, Wis.

[21] Appl. No.: 249,456

[22] Filed: Sep. 22, 1988

Related U.S. Application Data

[62] Division of Ser. No. 67,730, Jun. 26, 1987, Pat. No. 4,791,159.

[51] Int. Cl.$^5$ .............................................. B32B 31/00
[52] U.S. Cl. ..................................... 156/280; 156/278; 156/327
[58] Field of Search ......................... 156/278, 280, 327

[56] References Cited

U.S. PATENT DOCUMENTS

| | | | |
|---|---|---|---|
| 2,595,953 | 5/1952 | Kunze et al. | 524/376 |
| 2,833,737 | 5/1958 | Mark et al. | 524/376 |
| 3,442,845 | 5/1969 | Columbus et al. | 524/503 |
| 3,513,114 | 5/1970 | Hahn et al. | 524/376 |
| 3,530,080 | 9/1970 | Inskip | 524/503 |
| 3,563,851 | 2/1971 | Armour et al. | 524/503 |
| 3,573,236 | 3/1971 | Barlow | 524/503 |
| 3,600,342 | 8/1971 | Nickerson et al. | 524/503 |
| 3,632,786 | 1/1972 | Nickerson | 524/503 |
| 3,906,135 | 9/1975 | Krutzel | 524/503 |
| 4,131,581 | 12/1978 | Coker | 524/376 |
| 4,251,400 | 2/1981 | Columbus | 524/503 |
| 4,405,747 | 9/1983 | Ehmann et al. | 524/503 |
| 4,521,561 | 6/1985 | Hausman et al. | 524/503 |
| 4,605,589 | 8/1986 | Orphanides | 524/503 |

*Primary Examiner*—Joseph L. Schofer
*Assistant Examiner*—J. M. Reddick
*Attorney, Agent, or Firm*—Wood, Phillips, Mason, Recktenwald & VanSanten

[57] ABSTRACT

An elastomeric adhesive composition useful in resurfacing applications is provided. The composition includes a liquid dispersion of a polar latex resin binder, a chemical plasticizer, a volatile glycol ether solvent and a thickening agent. The binder is an emulsion of water and a polyvinyl acetate homopolymer with a polyvinyl alcohol protective colloid and is present in a concentration effective in adhering a resurfacing fabric to a surface wetted with the composition. The chemical plasticizer acts to plasticize and tackify the latex resin binder. The thickening agent is present in an amount effective to modify the viscosity of the composition so that it will not flow once applied to a surface. In addition, the invention comprehends a resurfacing composition and a method of resurfacing.

17 Claims, No Drawings

RESURFACING COMPOSITIONS AND METHODS

This is a division of application Ser. No. 067,730 filed June 26, 1987 now U.S. Pat. No. 4,791,159.

BACKGROUND OF THE INVENTION

1. Field of the Invention

This invention relates generally to adhesive compositions and, more particularly, this invention relates to elastomeric adhesive compositions useful in resurfacing applications and methods of resurfacing.

2. Description of the Related Art

In the past, in order to produce various desired colors of wall paints, it was common to add lead based pigments to a paint formulation. In this fashion, paints of various shades of white, yellow, green, orange, etc. were prepared. Such lead containing paints found extensive usage in much of the public housing built during the 1930's, 1940's, 1950's and into the 1960's, for example. During the latter portions of this time period, however, the public became increasingly aware of the harm resulting from the ingestion of lead and the dangers of exposure to lead and of lead poisoning.

Children, pets (such as dogs, cats, etc.) and even farm animals (such as cattle in contact with surfaces painted with lead containing paints) are a high risk group because they are more likely to be attracted to eating the generally sweet-tasting lead containing paint. Further, children housed in substandard housing or housing in general disrepair are likely to be especially at risk because, frequently, such housing was last painted with lead based paints before the rise in the public consciousness of the dangers of such paints and because such housing and the paint contained therein is often in poor repair, e.g., cracked and/or peeling.

In response to the now acknowledged dangers of lead exposure, two approaches for reducing exposure to lead painted surfaces have found use. The first of these approaches has been to remove the lead based paint or the surfaces onto which the lead based paint has been applied. Such an approach, however, is generally both time consuming and relatively costly. Further, such an approach also suffers from the danger of the increased lead exposures to which the workers are subjected to while in the process of removing the paint or the surfaces onto which such paint has been applied.

A second approach to reducing exposure to surfaces painted with lead based paints has been to resurface the surface so as to seal in the lead based paint and prevent exposure and accessibility to the lead. Such an approach has, in turn, led to a need for resurfacing adhesive compositions which provide a high tensile strength bond to the surface to which it has been applied, can be easily formulated, used and applied and are effective in adhering a resurfacing fabric to a surface wetted with such a composition.

SUMMARY OF THE INVENTION

It is an object of the invention to overcome one or more of the problems described above.

According to the invention, an elastomeric adhesive composition comprises a liquid dispersion of a polar latex resin binder, a chemical plasticizer, a solvent and a thickening agent. The polar latex resin binder comprises an emulsion of water and a polyvinyl acetate homopolymer with a polyvinyl alcohol protective colloid. The binder is present in a concentration effective to adhere a resurfacing fabric to a surface wetted with the composition. The chemical plasticizer is effective in plasticizing and tackifying the latex resin binder. The solvent includes a volatile glycol ether. The thickening agent is present in an amount effective to modify the viscosity of the composition so that, at atmospheric conditions, the composition will not flow due to the influence of gravity once applied to a surface.

In addition, the invention comprehends novel resurfacing compositions and methods of resurfacing.

Other objects and advantages of the invention will be apparent to those skilled in the art from the following detailed description, taken in conjunction with the appended claims.

DETAILED DESCRIPTION OF THE INVENTION

According to the invention, elastomeric adhesive compositions useful in resurfacing applications and methods of resurfacing are provided. In this formulating approach to elastomeric adhesives, a liquid dispersion is formed wherein a polar latex resin binder comprising an emulsion of water and a polyvinyl acetate homopolymer having a polyvinyl alcohol protective colloid is used as the primary binder. Polyvinyl acetate homopolymers are the dominant resins used in the adhesive industry. The high polarity of these resins result in high tensile strength bonding of the resin to the surface to which it has been applied.

The polyvinyl acetate homopolymer is preferably in an emulsion with polyvinyl alcohol. The polyvinyl alcohol forms a protective colloid about each micell of the emulsion. The protective coating helps prevent particles of the emulsion from undesirably coagulating to form a mass of resin. In such emulsions, the number average molecular weight of the homopolymer will generally be in the range of about 1,000,000 to 1,500,000 atomic mass units (amu). As is known in the art, the size of the molecule is directly related to the strength of the resin.

The use of a polyvinyl acetate homopolymer in the form of a solvent solution generally results in a comparatively low molecular weight homopolymer, e.g., a homopolymer having a number average molecular weight in the range of only about 13,000–14,000 amu. In practice, because emulsions permit a higher molecular weight homopolymer to be obtained and the molecular weight is directly related to the strength of the adhesive, emulsions rather than solvent solutions are preferred.

In addition, large quantities of heat are generated upon polymerization. Therefore, the use of an emulsion form of composition enables the formulator to relatively easily and quickly remove heat generated during the polymerization process. Water is a preferred heat transfer medium as water may be continuously circulated in the reactor under agitation so that the water serves to transfer generated heat between the micells of the emulsion and the walls of the reactor. Further, as is known in the art, control of the heat of polymerization allows one to control the reaction rate and consequently permits the formulator to obtain emulsions having a generally uniform composition rather than coagulated masses of material.

In a preferred embodiment, the resin binder has a non-volatile content of about 54–56 wt % of the binder, a particle size range of about 0.5–3.0 microns with an average of about 0.17 microns, a viscosity in the range of about 1,100–1,600 centipoises (in solution), a solution specific gravity of about 1.10, a solid specific gravity of about 1.19 and a solution pH of about 4.0–5.0. Further, the latex resin binder is present in an amount equal to about 24–26 wt % of the composition, with a concentration range of about 24.25–24.5 wt % being especially preferred.

The composition also includes a chemical plasticizer effective in plasticizing and tackifying the latex resin binder. Generally, a chemical type of plasticizer such as a dibasic acid ester or derivative is preferred because in addition to plasticizing the resin, chemical plasticizers also serve to tackify the resin. As is generally known to those skilled in the art, the tackiness of a resin is directly related to the ability of the resin to bind materials together upon evaporation of water therefrom. For example, dibutyl phthalate, butyl benzyl phthalate and dioctyl phthalate have been found useful in the practice of the invention, with dibutyl phthalate being an especially preferred chemical plasticizer for use in the practice of the invention.

Generally, plasticizers present in an amount equal to about 4–8 wt % of the polyvinyl acetate homopolymer resin solids are preferred, with plasticizer present in an amount equal to about 5.5–5.9 wt % of the polyvinyl acetate homopolymer resin solids being especially preferred.

The composition also includes a solvent. The class of volatile glycol ethers such as ethylene glycol monopropyl ether, propylene glycol monoethyl ether, propylene glycol monopropyl ether and ethylene glycol are preferred solvents for use in the practice of the invention, with 2-propoxyethanol being especially preferred. It is also believed that solvents such as n-methyl-2-pyrrolidone can be used but because of their relatively high cost are generally not preferred for use in the practice of the invention.

It is also generally preferred that the solvent be water miscible to facilitate the formation of the emulsion. Solvents that are not water miscible require the addition of increased amounts of surfactant to the composition which in turn increase the sensitivity of the composition to water. For example, a composition having a high degree of sensitivity to water increases the likelihood that use in applications having exposure to high humidity, such as moisture vapor build-up experienced in bathrooms, will result in a softening of the composition and consequent deterioration of the adhesive properties of the composition.

In a preferred embodiment, the composition includes glycol ether present in an amount equal to about 12–16 wt % of the polyvinyl acetate homopolymer resin solids, with glycol ether present in an amount equal to about 14–15 wt % of the polyvinyl acetate homopolymer resin solids being especially preferred.

A thickening agent is added in the composition in an amount effective to modify the viscosity of the composition so that, at atmospheric conditions, the composition will not flow due to the influence of gravity once applied to a surface, such as a surface being resurfaced or a fabric used in resurfacing compositions. Generally, the viscosity of the composition is adjusted to the range of about 2,700–3,100 centipoises, using a suitable thickening agent such as a water soluble cellulosic thickener and/or pigment. To obtain the desired rheology for the composition, it is been found that it is generally preferable to use a combination of one or more different pigments and/or water soluble cellulosic thickeners.

The primary function of the thickening agent is to improve the application characteristics of the composition. For example, for conventional spray gun applications, a composition which when applied will yield a substantially non-varying layer thickness of about 16–20 mils is desired.

For example, cellulosic thickeners, such as methyl cellulose, hydroxy ethyl cellulose, methoxy hydroxy ethyl cellulose and sodium carboxy ethyl cellulose, in an effective amount, generally in the range of about 0.3–0.4 wt % of the total product, is generally preferred for use in the practice of the invention. In addition, thickening agents such as polyvinyl pyrrolidone may also have some applicability in the practice of the invention.

In such compositions, the pigments in addition to their named designation also function, at least in part, as thickening agents. Pigments such as attapulgite mineral clay and bentonite clay have been used in the practice of the invention. Colloidal acicular, attapulgite mineral clay, however, is generally preferred because such a pigment facilitates the obtaining of the desired rheology for the composition without unacceptably effecting other properties, e.g. adhesion, of the composition. For example, bentonite clays are generally effective in obtaining a composition with a desired degree of viscosity, e.g., a composition which will not flow off a surface once it has been applied, only when such bentonite clays are present in relatively high concentrations. Generally, the presence of the bentonite clays in the relatively high concentrations required thereof undesirably interferes with the adhesive characteristics of the composition. Generally, it has been found preferable that the composition contain about 1.0–1.5 wt % attapulgite mineral clay with a composition containing about 1.2 wt % attapulgite mineral clay being especially preferred.

The composition may also include property and application characteristic modifying agents such as magnesium silicate, diatomaceous silica or mixtures thereof. Generally, it is preferred that the composition yield a material having relatively low sheen and a proper viscosity for desired application characteristics. The sheen of the composition is an important parameter as compositions that upon drying provide a glossy sheen are generally more difficult to adhere fabric or other materials to.

In the practice of the invention, the addition of substantially equal parts (in terms of weight) of magnesium silicate and diatomaceous silica has been found to be preferred in obtaining a composition having desired properties of relatively low sheen and the desired degree of viscosity. Diatomaceous silica generally posses a water absorption capacity which is about five times as great as magnesium silicate. As the amount of diatomaceous silica increases, however, the adhesive qualities of the composition deteriorate as the diatomaceous silica absorbs greater and greater proportions of the resin and the remainder of the composition. Thus, in the practice of the invention, it is preferred that a mix of diatomaceous silica and magnesium silicate be used as a modifying agent.

In a preferred embodiment, the composition includes a mixture of equal parts of magnesium silicate and diatomaceous silica representing a concentration of about 12–15 wt % of the total composition, with an equal part mixture of magnesium silicate and diatomaceous silica in an amount of about 13.5–14.0 wt % of the total composition being especially preferred.

The composition may also contain an opacifying agent such as the commonly used titanium dioxide. Such opacifying agents are generally effective in relatively small concentrations such as 3-5 wt %, preferably 3.5-4 wt %, of the total composition.

In addition to water, the balance of the composition may include additives such as surfactants, dispersants, bactericides, mildewcides and ammonia.

Additives such as dispersants, surfactants and combinations thereof, are added primarily for the purpose of maintaining the pigments in suspension in the liquid dispersion. Anionic forms of these additives are generally preferred for use in the practice of the invention.

Bactericides are added so as to reduce spoilage of the composition in storage.

Mildewcides are added in order to prevent the growth of mildew which generally digests the cellulosic components of compositions and result in a blackened defacement of the surface to which the composition is applied.

Ammonia is primarily added for purposes of pH control. It has been found that such compositions are generally more stable at neutral or slightly alkaline pH.

The above described elastomeric adhesive composition has been found useful in resurfacing applications such as the resurfacing of walls having lead paint peeling therefrom.

In such applications, the adhesive composition is applied to the surface in the form of a coating in a quantity sufficient to bridge or mask surface imperfections, such as chips and mirror pits and dents, and to allow a resurfacing fabric to be mounted thereto. Generally, the composition is applied, such as by brush, roll or spray application, so as to form a wet film having a thickness of about 14-16 mils. Spray application is a generally preferred application technique because it permits the application of the composition in a desired quantity in a relatively short period of time as compared to other standard application methods. The composition will generally dry in about the time it takes the water to evaporate. Thus, when the relative humidity is high, generally longer periods of time are required in order for the composition to dry.

A fibrous resurfacing fabric layer, such as a substantially continuous non-woven fiberglass fabric, is then applied onto the adhesive composition wet film, i.e., the first coating of the adhesive composition and the fabric layer are juxtaposed relative each other. The resurfacing fabric serves to reinforce the system, providing strength and a basic contour to the system. Non-woven resurfacing fabrics are preferred because, generally, they are comparatively easier to handle and less expensive than woven types of fabric. In addition, non-woven fiberglass fabric, unlike woven types of fiberglass fabric which has a tendency to collapse under its own weight, has greater rigidity which facilitates handling and use thereof.

Fabrics made of fiberglass are generally preferred because fiberglass generally is not subject to combustion and is relatively inert to attack by organisms or reaction with chemicals or other cleaning compounds. It is to be understood, however, that other types of resurfacing materials, such as burlap, cotton or nylon cloth or nylon hose, may, if desired, be used in the practice of the invention.

A non-woven fiberglass fabric may be prepared by many techniques such as the common technique wherein fiberglass fibers are coated with a resin with fibers laid out together then processed through a roller and into an oven wherein the resin coated fibers are heated to a temperature sufficient to fuse the resin coatings. The fiber web is then processed through rollers to ensure proper compaction of the fiberglass fibers. Such fiberglass fabric may be purchased in a roll form and cut to desired dimensions.

The resurfacing fabric in addition to serving to bridge defects in the work surface, also functions as a blocking medium which acts to absorb shifts and pressure which may have initially created the cracks in the surface to be resurfaced. Thus, according to the invention, the fabric matting acts to block the transfer of cracks to the top or finished coating of the resurfaced surface.

Resurfacing fabric is generally available in a range of thicknesses with fabrics 10-25 mils being preferred and fabrics 20-25 mils being especially preferred in that they can more easily bridge or compensate for imperfections in the surface. It being understood, that thicker fabric layers also generally act as a more effective barrier in lead abatement programs.

After application, such non-woven fiberglass fabrics may be acted upon by a device like a roller, e.g., a paint roller, so as to insure that the fabric has been applied in a smooth fashion.

Onto the outward facing exposed surface of the fabric material, a finished surface coating, i.e., top coating, of the above-described adhesive composition is applied. The composition impregnates interstices between fibers of the outward facing exposed surface of the resurfacing fabric, with the top coating filling openings or gaps in the resurfacing fabric so as to eliminate the transfer of the texture of the resurfacing fabric to the exposed resurfaced surface.

Such a coating is generally applied so as to form a wet film having a thickness of about 14-16 mils. Further, the adhesive composition has a viscosity sufficient so that at atmospheric conditions the top coating will not flow due to the influence of gravity when applied to the resurfacing fabric. The resulting resurfaced surface, e.g., the outward facing surface of the resurfacing composition, is thus a smooth looking surface that can be painted like other wall materials such as plaster or dry wall.

Because water evaporation results in a substantial reduction in the film volume, the dried resurfacing composition has a thickness of only about 21-36 mils.

The following example illustrates the practice of the present invention. It is to be understood that all changes and modifications that come within the spirit of the invention are desired to be protected and thus the invention is not to be construed as limited by this example.

EXAMPLE

In the table (below), a preferred resurfacing adhesive composition is identified with the concentration of each component listed in weight percent of the total composition.

TABLE

| Ingredient | Concentration (wt %) |
| --- | --- |
| polyvinyl acetate homopolymer solids | 24.4 |
| dibutyl phthalate | 1.4 |
| 2-propoxyethanol | 3.5 |
| titanium dioxide | 3.7 |
| magnesium silicate | 7.0 |
| diatomaceous silica | 7.0 |
| attapulgite mineral clay | 1.2 |

TABLE-continued

| Ingredient | Concentration (wt %) |
|---|---|
| methyl cellulose | 0.3 |
| mildewcide | 0.4 |
| anionic dispersant | 0.3 |
| surfactant | 0.3 |
| bactericide | |
| defoamer | 0.3 |
| ammonia | |
| water | 50.2 |
| | 100 |

The foregoing detailed description is given for clearness of understanding only, and no unnecessary limitations are to be understood therefrom, as modifications within the scope of the invention will be obvious to those skilled in the art.

We claim:

1. A method of resurfacing comprising the steps of:
applying a first coating of an adhesive composition to a surface to be resurfaced in a quantity sufficient to bridge imperfections in said surface and to mount a resurfacing fabric thereto, said adhesive composition having an applied thickness of at least about 14 mils and comprising a liquid dispersion of a polar latex resin binder comprising an emulsion of water and a polyvinyl acetate homopolymer with a polyvinyl alcohol protective colloid, said binder being present in a concentration effective to adhere a resurfacing fabric to a surface wetted with said composition; a chemical plasticizer effective in plasticizing and tackifying said latex resin binder; a solvent comprising a volatile water miscile glycol ether; a thickening agent present in an amount effective to modify the viscosity of said composition so that at atmospheric conditions said composition will not flow due to the influence of gravity once applied to a surface having interstices; and about 6 to about 7½ wt % diatomaceous silica;
applying a substantially continuous fibrous resurfacing fabric onto said adhesive coated surface, said applied resurfacing fabric having an outward facing exposed surface; and
applying a top coating of said adhesive composition, impregnating said interstices of said outward facing exposed surface of said resurfacing fabric and providing a substantially smooth outward facing surface, said adhesive composition having a viscosity sufficient so that at atmospheric conditions said top coating will not flow due to the influence of gravity once applied to said resurfacing fabric.

2. The method of claim 1 wherein said first coating of adhesive composition and said top coating of adhesive composition are applied by a method selected from the group consisting of brush, roll, and spray application.

3. The method of claim 1 wherein said first coating of adhesive composition forms a wet film having a thickness of about 14-16 mils.

4. The method of claim 1 wherein said resurfacing fabric comprises a non-woven fiberglass fabric having a thickness of about 10-25 mils.

5. The method of claim 1 wherein said top coating of adhesive composition has a thickness of about 14-16 mils.

6. The method of claim 1 wherein after drying a total thickness of about 21-36 mils has been added to said surface.

7. The method of claim 1 wherein said polyvinyl acetate homopolymer comprises about 24-26 wt % of said composition and has a number average molecular weight of between about 1,000,000 and 1,500,000 atomic mass units.

8. The method of claim 1 wherein said latex resin binder comprises a non-volatile content of about 54-56 wt % of said binder, a particle size of about 0.5-3.0 microns and has a viscosity in the range of about 1,100-1,600 centipoises in solution.

9. The method of claim 1 wherein said chemical plasticizer comprises a dibasic acid ester or derivative present in an amount equal to about 4-8 wt % of the polyvinyl acetate homopolymer resin solids.

10. The method of claim 1 wherein said chemical plasticizer is selected from the group consisting of dibutyl phthalate, dioctyl phthalate and butyl benzyl phthalate.

11. The method of claim 10 wherein said plasticizer comprises dibutyl phthalate.

12. The method of claim 1 wherein said glycol ether is selected from the group consisting of ethylene glycol monopropyl ether, propylene glycol monoethyl ether, propylene glycol monopropyl ether and 2-propoxyethanol and is present in an amount equal to about 12-16 wt % of the polyvinyl acetate homopolymer resin solids.

13. The method of claim 12 wherein said glycol ether comprises 2-propoxyethanol.

14. The method of claim 1 wherein said thickening agent is selected from the group consisting of pigment, water soluble cellulosic thickeners and combinations thereof.

15. The method of claim 1 wherein said adhesive composition additionally comprises colloidal acicular, attapulgite mineral clay present in a concentration of about 1-1.5 wt % of said composition.

16. The method of claim 1 wherein said adhesive composition additionally comprises substantially equal parts of magnesium silicate and said diatomaceous silica present in a total amount equal to about 12-15 wt % of said composition.

17. The method of claim 1 wherein said adhesive composition additionally comprises an additive selected from the group consisting of dispersants, surfactants and combinations thereof, said additives being effective in maintaining said pigments in suspension in said liquid dispersion.

* * * * *